Patented June 12, 1951

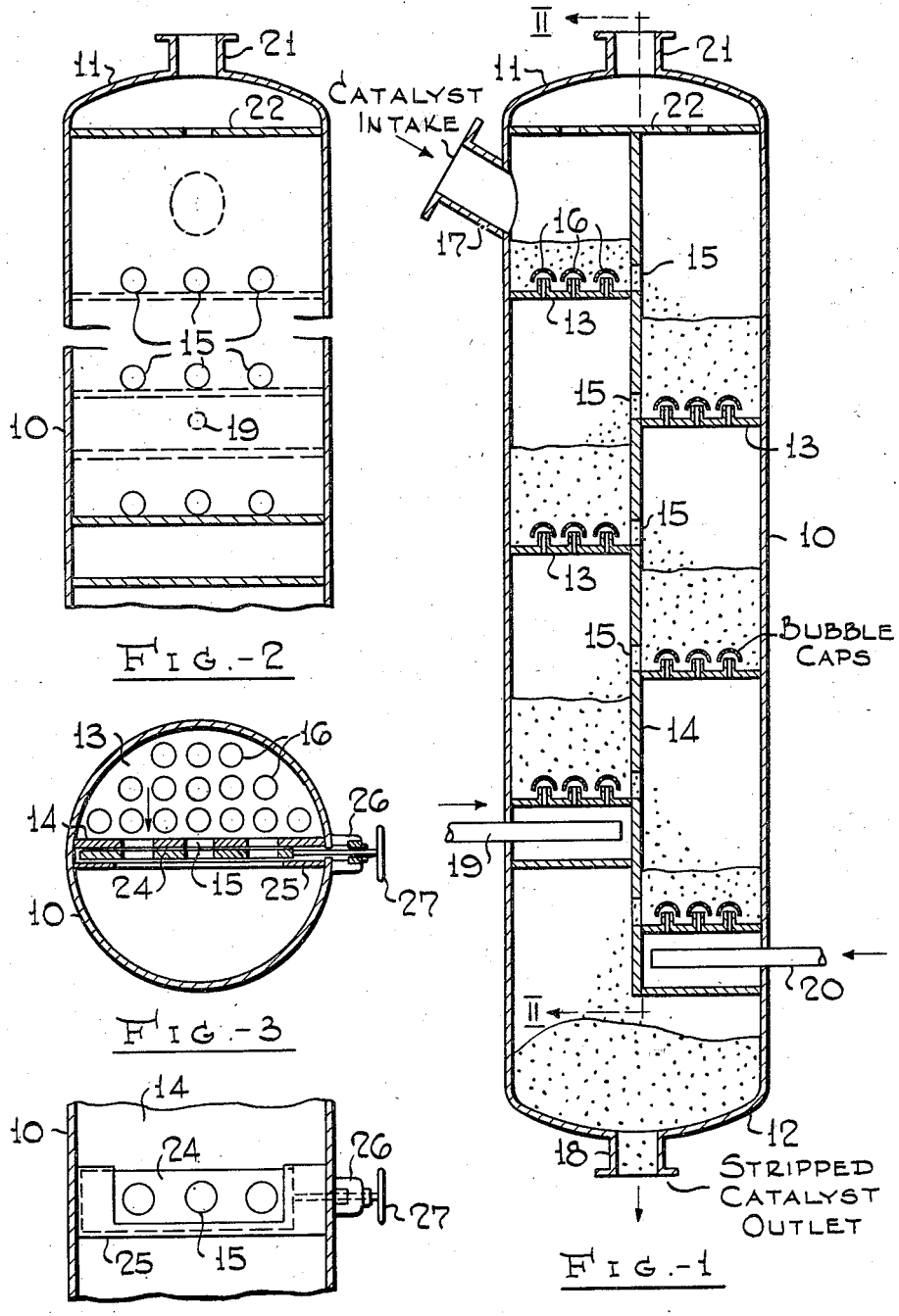

2,556,301

UNITED STATES PATENT OFFICE 2,556,301

CONTACTING SOLID PARTICLES AND GASEOUS FLUIDS

Walter Squires, Jr., Westfield, N. J., and Lyle L. Zahn, Jr., New York, N. Y., assignors to Standard Oil Development Company, a corporation of Delaware Application December 10, 1949, Serial No. 132,366

4 Claims. (Cl. 34—57)

This invention pertains to the contacting of solid particles and gaseous fluids and more particularly, to an improved apparatus or system for effecting countercurrent contact of finely divided solid particles with gaseous fluids in stages.

It has been proposed in U. S. Patent No. 2,444,990 to pass vapors and/or gases through a reaction zone or vessel in a direction countercurrent to the flow of finely divided solid contact material by providing a plurality of horizontal plates in vertically spaced relation in a vessel, providing perforations or bubble caps in the several plates for passage of gaseous materials therethrough, providing an inlet for solid particles and an outlet for gaseous products above the uppermost plate and an inlet for gaseous materials and an outlet for solid particles below the lowermost plate and providing weir means for maintaining a level of fluidized solid particles on each of the plates and downcomers or conduits for conducting solid particles overflowing the weir means to the next lower horizontal plate. While reactor systems of this type are highly effective in bringing about countercurrent contact of finely divided solids and gaseous materials in several stages, substantial difficulties have been encountered in effecting transfer of the solid particles from plate to plate. In general, aeration of the downcomers or conduits for conducting the solid particles from plate to plate is necessary. However, for process reasons, minimum aeration of the solids in the downcomers is desirable. Accordingly, mechanical design modifications to the downcomer or to the entire tower which would avoid or minimize aeration of the downcomer are highly desirable.

It is the object of this invention to provide the art with a tower design which permits a smooth flow of large quantities of solid particles therethrough.

It is a further object of this invention to provide the art with a tower design that avoids the use of separate downcomers requiring aeration to effect transfer of solids from plate to plate.

These and other objects will appear more clearly from the detailed specification and claims which follow.

It has now been found that a highly effective device for contacting gaseous or vaporous materials and finely divided solid contact particles is one consisting of a tower equipped with a multiplicity of horizontal half-section bubble cap plates arranged in staggered relationship and separated by a vertical baffle which is pierced with openings at selected points to permit flow of fluidized solids from plate to plate. Solid contact particles are supplied to the tower above the uppermost bubble cap plate and withdrawn from the tower below the lowermost bubble cap plate. Gaseous or vaporous materials are supplied near the bottom of the tower, the baffle means dividing the stream of gaseous or vaporous material into two paths which merge at the top of the tower, the gaseous or vaporous materials being withdrawn through an outlet at the top of the tower. Orifice plates are arranged at the outlet of each gas path in order to control gas distribution through the tower, particularly during the starting up period. Additional flexibility in the operation of the tower may also be obtained by providing means for adjusting the size of the openings or orifices in the vertical baffle in order to control the flow of solids from plate to plate.

Reference is made to the accompanying drawing illustrating the present invention in which Fig. 1 is a vertical cross section of a tower in accordance with the present invention;

Fig. 2 is a vertical cross section of the tower along the line II—II of Fig. 1;

Fig. 3 is a plan view of one bubble cap plate in a modified tower provided with means for adjusting the size of the openings in the vertical baffle plate; and Fig. 4 is a side elevation of the adjusting means shown in Fig. 3.

In the drawing, 10 designates a reaction vessel which comprises a long cylindrical body portion and dome or other suitably shaped end portions 11 and 12. A plurality of half-section plate members 13 are arranged in spaced, staggered relationship. A vertical baffle 14 divides the interior of the main portion of the reaction vessel into two sections. Restriction orifices 15 are arranged in the vertical baffle adjacent each of the plate members 13 to control the flow of fluidized solids off of each plate. Bubble caps 16 or suitable perforations are provided in each of the plate members for the passage of gaseous materials therethrough.

An inlet 17 is arranged at the upper part of vessel 10 for the introduction of finely divided solid particles above the uppermost half section plate member. An outlet 18 is provided in the bottom of the vessel 10 for the withdrawal of finely divided solids. Since the vertical baffle member 14 divides the interior of the vessel into two parallel gas paths, two inlet nozzles 19 and 20 are provided below the lowermost perforated plates on each side of the baffle for the introduction of gaseous or vaporous materials into the vessel. An outlet 21 for gaseous or vaporous materials is provided at the top of the end portion 11 for the withdrawal of gaseous materials. An orifice plate 22 is provided at the outlet of each of the gas paths at the top of the vessel in order to permit better gas distribution at this point particularly during the initial charging of finely divided solids.

While the restriction orifices 15 shown in the baffle member 14 and in the orifice plate 22 are of the fixed type, they can also be made adjustable in order to vary the flow of solid particles and gaseous or vaporous materials at one or more points in the system. Suitable means for adjusting the size of the openings in the restriction orifices 15 are illustrated in Figs. 3 and 4. As there shown, adjustability of the openings may be achieved by providing a movable plate 24 in a guide member 25 adjacent the restriction orifices 15. Controlled lateral movement of the plate 24 may be obtained by securing a standard valve stem assembly 26 to the wall of the vessel 10 and securing the stem or shaft to the end of the movable plate 24. A hand wheel 27 or the like is provided on the valve assembly to facilitate adjustment of the movable plate. Total lateral movement of the plate member 24 equivalent to the diameter of the orifices 15 is provided. It is preferable to arrange the movable plate 24 and guide 25 on the downstream side of plate 14 since the downstream side will place the movable elements in the dilute solids phase with less chance of solids plugging or escaping around the shaft through the tower shell.

The apparatus in accordance with the present invention may be utilized for the conversion of hydrocarbon materials such as the cracking of gas oil or heavier petroleum fractions, the reforming of petroleum fractions boiling within the motor fuel range and for other reactions requiring contact of gaseous reactants with powdered solids. It may also be used for the adsorption of certain gaseous materials from mixtures containing the same or for the stripping of entrained or adsorbed hydrocarbon materials from spent hydrocarbon conversion catalyst preparatory to regeneration of the same or for the desorption of activated carbon or the like that has been utilized for gas adsorption purposes by supplying steam or inert stripping gas to the inlet nozzles. It may also be used for the regeneration of spent catalyst particles that have been used for the conversion of hydrocarbon materials by contacting the spent catalyst particles with regeneration gases.

The operation of the apparatus in accordance with this invention when applied, for example, to the stripping of spent cracking catalyst is as follows. Finely divided cracking catalyst particles such as acid treated bentonite clay, synthetic silica alumina gel or synthetic silica-magnesia gel are supplied to the upper part of the vessel 10 through the catalyst intake 17. The particle size of the solid materials is generally below about 200 microns and is preferably in the range of from about 20 to 80 microns.

Stripping gas such as steam or inert gas such as nitrogen, carbon dioxide or flue gas is introduced through the inlet nozzles 19 and 20 in such amounts that the superficial velocity of the gas is from about 0.5 to about 3.0 feet per second. At vapor velocities within this range, the solid particles are fluidized on each of the plate members to form a dry, dense, liquid simulating bed. The feed rate of the solid particles and the size of the restriction orifices in the baffles is so controlled as to give the desired hold up of powdered contact material. The level of the catalyst bed builds up to a greater depth on the several plates below the uppermost plate because the head of catalyst (depth of bed) is in equilibrium with the sum of the pressure drops encountered by the catalyst entering and leaving each plate plus the pressure drop of the steam or other gas passing through the plate. The level on the lowermost plate is similar to that on the uppermost plate since it depends essentially only on the pressure drop of the solid particles passing through the restriction orifices in the baffle plate 14 into the bottom of the vessel.

The disengaging space above the dense phase or bed on each plate should be at least 18 inches. A suitable plate spacing would be about 4 feet for plates in the same gas circuit or about 2 feet between adjacent plates when the pressure drop through the restriction orifices in the baffle plate 14 at each plate is equivalent to 8 inches of catalyst and the pressure drop of steam or other gas through each half section plate is equivalent to a head of 3 inches of catalyst. The depth of the catalyst bed on the uppermost and lowermost plates would be 8 inches and that on each of the intermediate plates would be 8+8+3 or 19 inches. Thus with a plate spacing of 4 ft. or 48 inches there would be a minimum disengaging height of 48 inches minus 19 inches or 29 inches which is well above the minimum of 18 inches.

While as shown in the drawing the dense bed level is below the catalyst inlet holes or slots or restriction orifices in the baffle plate 14, it is also possible to carry the catalyst level above the said restriction orifices. However, it is not considered advantageous to operate in this manner because with high dense bed levels the catalyst level will drop as the catalyst rate and/or the gas or vapor rate is increased. This is directly opposite to the effect when operating at lower levels. Accordingly, the catalyst or powder holdup would decrease and reduce the vapor-solids contact efficiency. Moreover, with a high dense phase level, the catalyst holdup on the plates is more than at low level but the disengaging height is reduced unless a greater plate spacing is used.

The foregoing description contains a limited number of embodiments of the present invention. It will be understood, however, that numerous variations are possible without departing from the scope of the following claims.

What is claimed is:

1. An apparatus for the continuous countercurrent contact of finely divided solids and gaseous material comprising a vessel, an inlet for finely divided solids and a separate outlet for gaseous materials in the upper part of said vessel, an outlet for finely divided solids in the bottom of said vessel, a vertical baffle plate dividing the interior of the vessel into two parallel paths, a plurality of perforated half section plates arranged alternately on opposite sides of the said vertical baffle plate and in vertically spaced relation, restriction orifices in the vertical baffle plate just above each of said half section plates for controlling the removal of finely divided solids from each of the plates, and an inlet for supplying gaseous material beneath the lowermost half section plate on each side of the vertical baffle plate.

2. An apparatus for the continuous countercurrent contact of finely divided solids and gaseous material comprising a vessel, an inlet for finely divided solids in the upper part of said vessel, an outlet for finely divided solids in the bottom of said vessel, a vertical baffle plate dividing the interior of the vessel into two parallel paths, a plurality of perforated half section plates arranged alternately on opposite sides of the said vertical baffle plate and in vertically spaced relation, restriction orifices in the vertical baffle plate just above each of said half section plates for controlling the removal of finely divided solids from each of the plates, an inlet for supplying gaseous material beneath the lowermost half section plate on each side of the vertical baffle plate, an outlet for gaseous materials in the top of said vessel and an orifice plate arranged at the top of said baffle plate for controlling the discharge of gaseous materials from each of said paths to said outlet for gaseous materials.

3. An apparatus for the continuous countercurrent contact of finely divided solids and gaseous material comprising a vessel, an inlet for finely divided solids and a separate outlet for gaseous materials in the upper part of said vessel, an outlet for finely divided solids in the bottom of said vessel, a vertical baffle plate dividing the interior of the vessel into two parallel paths, a plurality of perforated half section plates arranged alternately on opposite sides of the said vertical baffle plate and in vertically spaced relation, restriction orifices in the vertical baffle plate just above each of said half section plates for controlling the removal of finely divided solids from each of the plates, means for adjusting the size of the restriction orifices in order to vary the pressure drop therethrough, and an inlet for supplying gaseous material beneath the lowermost half section plate on each side of the vertical baffle plate.

4. Apparatus as defined in claim 3 wherein the means for adjusting the size of the restriction orifices comprises a narrow movable plate having openings therein corresponding to the restriction orifices in the vertical baffle plate and means for moving said plate laterally a distance equal to the diameter of one of said restriction orifices.

WALTER SQUIRES, Jr.
LYLE L. ZAHN, Jr.

REFERENCES CITED

The following references are of record in the file of this patent:

UNITED STATES PATENTS

| Number | Name | Date |
|---|---|---|
| 1,155,402 | Bornmann | Oct. 5, 1915 |
| 1,738,870 | Cox et al. | Dec. 10, 1929 |
| 2,444,990 | Hemminger | July 13, 1948 |
| 2,470,483 | Gadwa et al. | May 17, 1949 |